Aug. 10, 1926.

A. M. NICHOLS

PRESSURE REGULATOR

Filed Oct. 7, 1925

1,595,809

INVENTOR
A. M. NICHOLS
BY E. B. Birkenbeuel.
HIS ATTORNEY.

Patented Aug. 10, 1926.

1,595,809

UNITED STATES PATENT OFFICE.

ARTHUR M. NICHOLS, OF TIGARD, OREGON.

PRESSURE REGULATOR.

Application filed October 7, 1925. Serial No. 61,005.

This invention relates generally to the automotive industry, and particularly to devices for supplying air to pneumatic tires.

The first object of this invention is to provide an exceedingly simple and efficient pressure regulator which can be set at a predetermined pressure, and which will allow any excess air present in a tire to escape until the predetermined pressure is reached.

The second object is to so construct the device that it will be exceedingly smooth in operation, accurate in pressure settings and independent of fine workmanship.

Figure 2:
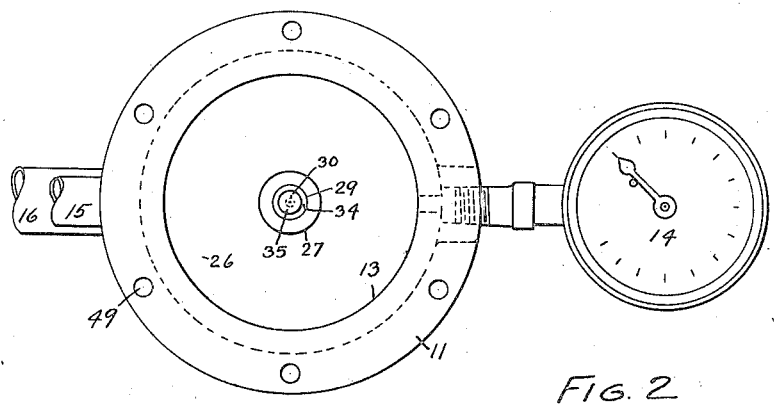
Figure 1:
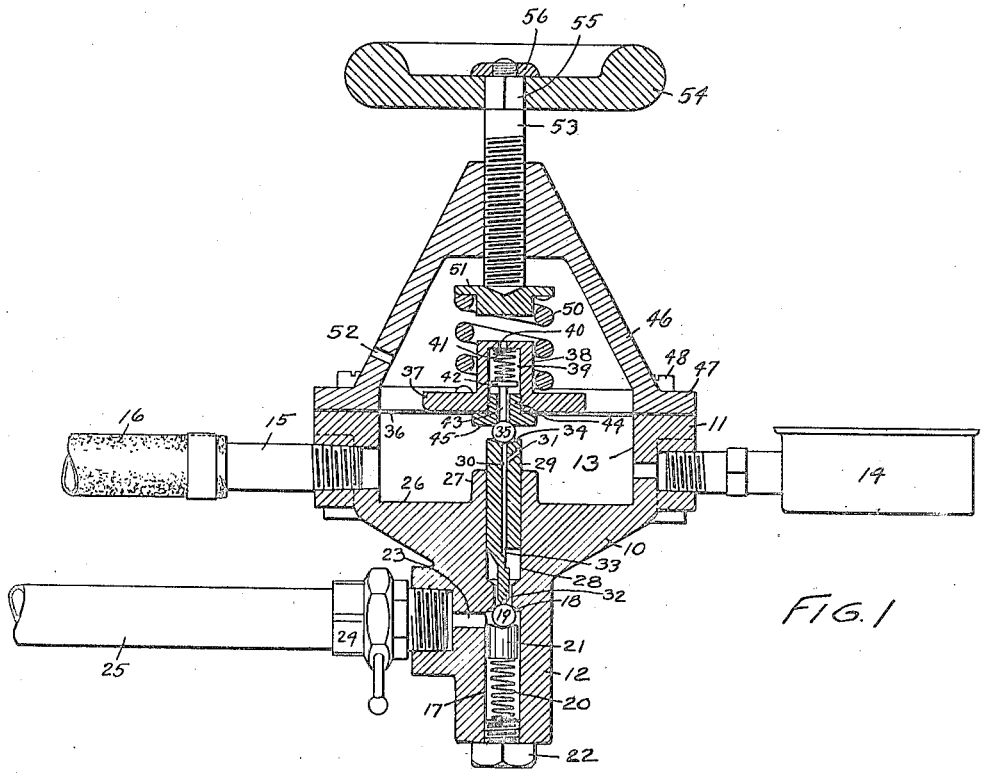

These results are accomplished in the manner set forth in the following specification and illustrated in the accompanying drawing, in which:

Figure 1 is a vertical section through the device of which Figure 2 is a plan view showing the diaphragm and parts above same removed.

Similar numbers of reference refer to the same parts throughout the views.

Referring in detail to the drawing, the device itself consists of a body member 10 having a flanged upper end 11 and a downwardly projecting stem 12. A chamber 13 is formed in the upper portion of the body 10. Connecting with the chamber 13 is an air gauge 14 of any convenient type, and a nipple 15 to which is attached an air hose 16 through which air is delivered to the tire. Extending upwardly into the stem 12 is an opening 17 at whose upper end is a seat 18 normally closed by a ball 19. The ball 19 is urged toward the seat 18 by pressure from the spring 20 acting through the plunger 21. A screw 22 is employed to hold the spring 20 within its opening.

Connecting with the opening 17 is a laterally extending port 23 which connects with a union 24, by means of which the device may be attached to an air supply pipe 25, if desired.

On the center of the floor 26 of the chamber 13 is formed a boss 27. An opening 28 extends downwardly through the boss 27 in line with, but not reaching, the seat 18. In the opening 28 is placed a plunger 29 having a central hole 30 and a side outlet hole 31. The plunger 29 has a smaller lower end 32 which normally rests upon the ball 19. The hole 30 does not extend into the small lower end but is provided with a side outlet 33 by cutting into the side of the plunger, as shown.

Obviously the same results could be obtained by making the plunger 29 solid and providing ample clearance around its outside in the form of grooves, if desired, without departing from the spirit of this invention.

The upper end 34 of the plunger 29 is capped to receive the ball 35. On top of the plunger 11 is placed a diaphragm 36 or metal or other material, and in the center of this diaphragm is mounted, on its upper side, a cylindrical head 37 having an upwardly extending shank 38. The shank 38 is provided with a large central opening 39 and a small outlet opening 40 at its top. In the opening 39 is placed a spring 41 on whose under side is the head 42 of a pin 43 which passes loosely through a screw 44 in whose head 45 is formed a seat for the ball 35.

On top of the diaphragm 36 is placed a cap 46 whose flanged rim 47 is joined to the flange 11 by means of the screws 48 which pass through the holes 49 in the flanges 11 and 47.

Around the shank 38 is placed a strong coil spring 50 on whose upper end is placed a head 51, preferably countersunk on its upper side. The cap 46 is provided with a vent 52 and a threaded stem 53 whose end engages the countersink in the member 51. A convenient hand wheel 54 is attached to the square upper end 55 on the stem 53 by means of a nut 56.

The operation of the device is as follows: Assuming that it is desired to deliver air at sixty pounds pressure through the hose 16 to a tire, the operator turns the hand wheel 54 until the gauge 14 indicates this pressure, and all of the air delivered after that will be at this pressure until the setting of the wheel 54 is changed. This action is secured as follows: Air at a much higher pressure being supplied from the supply pipe 25 at, let us say 150 pounds pressure, causes the ball 19 to be urged toward the seat 18. This is, however, offset by the action of the spring 50, which tends to unseat the ball 19 until sufficient air has accumulated within the chamber 13 to sufficiently raise the diaphragm 36 to permit the ball 19 to seat and cut off the further supply of air. If, of course, air is allowed to escape from the chamber 13 to the atmosphere or into the tire, the spring 50 will again unseat the ball 19 and admit more air from the pipe 25 through the holes 30 and 31 into the chamber 13. This portion of the device relates entirely to the delivery of air when the pressure in the tire is less than the pressure desired.

However, if the pressure in the tire exceeds the desired pressure, a different operation takes place. In this event, when the hose 16 is connected with the tire the excess of pressure flows to the chamber 13. Instead of building up a pressure in the chamber 13, the air released from the tire causes the diaphragm 36 to rise and unseat the ball 35 with the assistance of the spring 41, thereby permitting the excess of air to escape through the hole 40 and out of the vent 52 to the atmosphere, until the pressure in the tire is equal to the setting of the device.

I am aware that many forms of pressure regulators have been constructed in the past, many of which employ movable pistons to accomplish the objects which I accomplish by means of a diaphragm; I therefore do not claim such devices broadly, but I do intend to cover all such forms and modifications thereof as fall fairly within the appended claims.

I claim:

1. A pressure regulator having, in combination, an air container; a diaphragm closure for said container; an air supply pipe opening into said container; a check between said supply pipe and container; a check valve in said diaphragm; a plunger between said checks; an adjustable spring on the outside of said diaphragm; and a spring for unseating said diaphragm check valve.

2. A pressure regulator having, in combination, an air container; a diaphragm closure for said container; an air supply pipe opening into said container; a check valve closable by pressure from said supply pipe; a spring also tending to close said check; a second check valve in the diaphragm; a spring adapted to urge said diaphragm check away from its seat; a plunger between said checks; a heavy spring on the outside of said diaphragm tending to seat said diaphragm check and to unseat said air supply check; and means for varying the tension of said heavy spring.

3. A pressure regulator having, in combination, an air container; a diaphragm closure for said container; an air supply pipe opening into said container; a check valve closed by pressure in said container; a spring closing said check; a pressure gauge on said container; an air delivery line leading from said container; a check valve in said diaphragm; a spring for urging said diaphragm check away from its seat; a plunger between said checks; a heavy spring outside of said diaphragm adapted to seat said diaphragm check and unseat said supply check; a screw for varying the tension on said heavy spring; and means for rotating said screw.

4. A pressure regulator having, in combination, an air container having a cavity formed in one side thereof and having a hollow stem opening from said cavity, said stem having a ball check placed therein, said check having a spring on its outer side tending to seat same and having a high pressure air supply opening in said stem outside of said check, with means for closing the outer end of said stem; an air delivery line leading from said container; a diaphragm closure covering the cavity in said container; a check valve in said diaphragm; a spring tending to unseat said diaphragm check against pressure in said container; a plunger between said checks; a strong coil spring pressing against the outside of said diaphragm and tending to seat said diaphragm check and to unseat said air supply check; a cap over said diaphragm having an outlet port formed therein; and an adjusting screw in said cap for regulating the tension of said heavy coil spring.

ARTHUR M. NICHOLS.